(12) United States Patent  
O'Haire et al.

(10) Patent No.: US 8,923,622 B2  
(45) Date of Patent: *Dec. 30, 2014

(54) ORIENTATION COMPENSATION USING A MOBILE DEVICE CAMERA AND A REFERENCE MARKER

(71) Applicant: Symbol Technologies, Inc., Schaumburg, IL (US)

(72) Inventors: Michael O'Haire, Smithtown, NY (US); Russell E. Calvarese, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 221 days.

This patent is subject to a terminal disclaimer.

(21) Appl. No.: 13/709,183

(22) Filed: Dec. 10, 2012

(65) Prior Publication Data

US 2014/0161358 A1  Jun. 12, 2014

(51) Int. Cl.  
*G06K 9/48* (2006.01)  
*G06K 9/00* (2006.01)

(52) U.S. Cl.  
CPC .................................. *G06K 9/00664* (2013.01)  
USPC ........... 382/199; 382/268; 382/154; 382/274; 382/275; 382/309; 382/316

(58) Field of Classification Search  
CPC ..................... G06T 5/002; G06T 2207/30244; G06T 7/0042  
USPC ............ 382/199, 268, 154, 274, 75, 309, 316  
See application file for complete search history.

(56) References Cited

U.S. PATENT DOCUMENTS

| 8,660,362 B2 * | 2/2014 | Katz et al. ..................... 382/199 |
| 2007/0162221 A1 | 7/2007 | Witcraft et al. |
| 2012/0011119 A1 | 1/2012 | Baheti et al. |
| 2012/0086438 A1 | 4/2012 | Tu |
| 2012/0155382 A1 | 6/2012 | Grzechnik et al. |
| 2012/0157158 A1 | 6/2012 | Mayor et al. |
| 2012/0221290 A1 | 8/2012 | Oka et al. |

FOREIGN PATENT DOCUMENTS

| EP | 2439615 A2 | 4/2012 |
| EP | 2487458 A2 | 8/2012 |
| WO | 2011063282 A3 | 5/2011 |
| WO | 2011102865 A2 | 8/2011 |
| WO | 2012107268 A1 | 8/2012 |

OTHER PUBLICATIONS

"Indoor Navigation System Using Image and Sensor Data Processing on a Smartphone" by Luigi Atzori et al. Copyright 2012 IEEE.

* cited by examiner

*Primary Examiner* — Mike Rahmjoo

(57) ABSTRACT

A method and system for orientation compensation of a mobile device within an environment includes providing a plurality of reference markers having straight edges and having a defined, regular orientation with respect to the environment. Information about the orientation of the reference markers is supplied to a mobile device operating within the environment. An orientation sensor disposed within the mobile device estimates an orientation of the mobile device. An image of one reference marker is captured, and at least one edge of that reference marker is located. The estimated orientation is compensated by correcting for the reference marker orientation and aligning the corrected estimated orientation to the at least one edge of the reference marker that is closest to being parallel to the corrected estimated orientation.

5 Claims, 4 Drawing Sheets

ORIENTATION COMPENSATION USING A MOBILE DEVICE CAMERA AND A REFERENCE MARKER

FIELD OF THE DISCLOSURE

The present disclosure relates generally to a system for orientation, and more particularly to orientation compensation using a mobile device camera and a reference marker.

BACKGROUND

There are many techniques that can be used to determine an orientation of a mobile device within an environment, such as a retail, factory, warehouse, or other indoor environment, for example. Existing mobile devices, such as smart phones have several sensors (e.g. accelerometers, gyroscopes, and magnetometers) that can be utilized to calculate device motion and orientation. However, the accuracy of these sensors, and algorithms to determine orientation, vary greatly. The variation can be quite large for these sensors in some environments. For example, large metal structures, magnetic anomalies, and the like, can render magnetometer data useless in some situations.

In one solution, the orientation or motion sensors could be used to compensate each other. For example, a magnetometer may be adversely influenced by magnetic fields within the indoor environment such as those from electric motors, electronic lighting, displays, or monitors. To compensate for these magnetic anomalies, sensor data from the gyroscope and accelerometer could be used to correct for bad magnetometer data. However, the orientation sensors used in smart phones are relatively low cost, subject to drift, and do not provide a high degree of orientation accuracy.

Alternatively, inertial navigation can be used. Inertial navigation includes first determining a precise orientation of the mobile device and then tracking an orientation of the device using any one or more of the orientation or motion sensors. However, these internal reference techniques still result in errors in calculating orientation and are still subject to drift.

Accordingly, there is a need for a technique to accurately compensate an orientation of a mobile device in an indoor environment without modifying the mobile device hardware.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
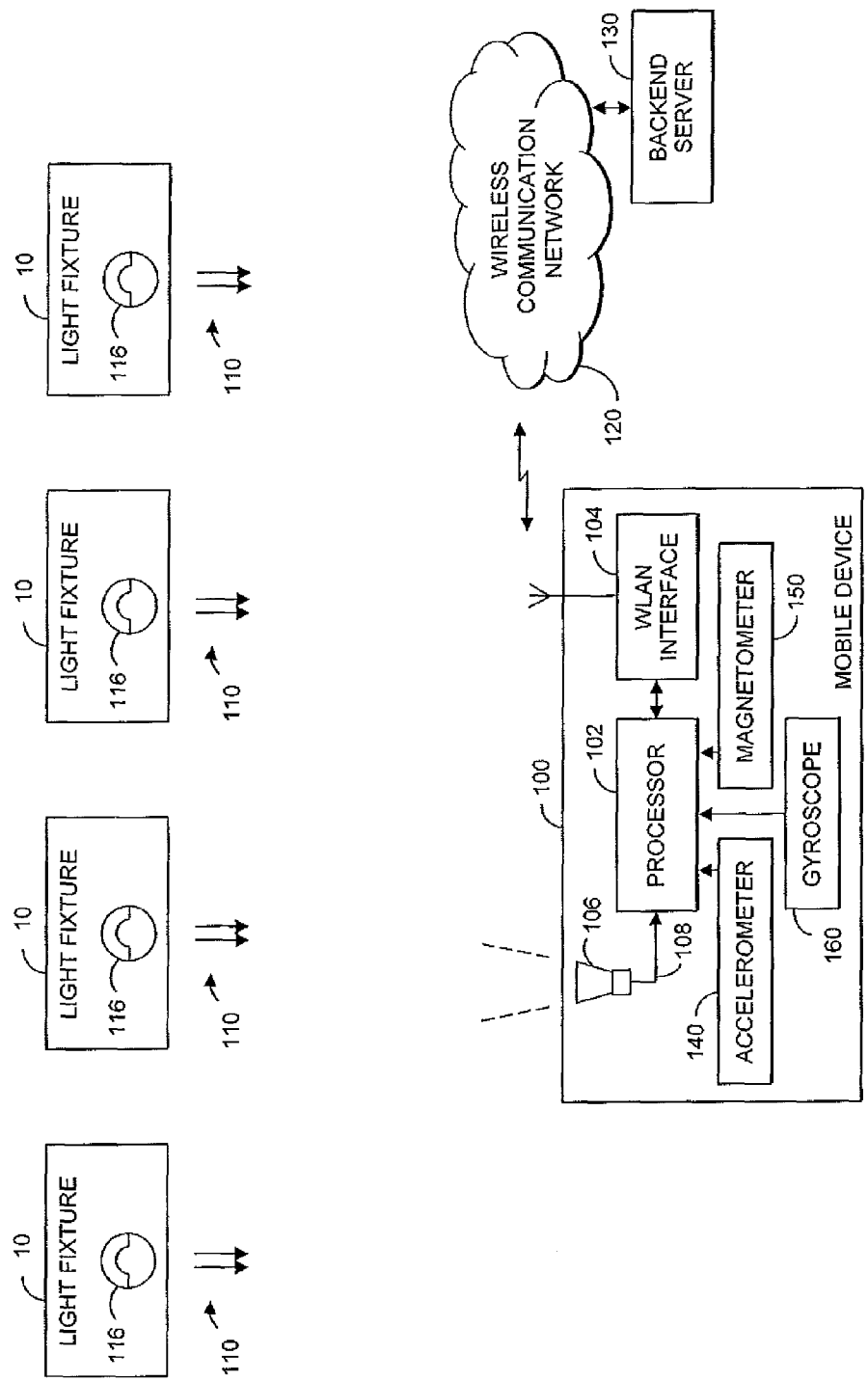
FIG. 1 is a simplified block diagram of an orientation system, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to compensate an orientation of a mobile device in an indoor environment without modifying the mobile device hardware and without requiring additional hardware changes within the environment. The present invention provides high orientation accuracy. The present invention also uses an existing camera and image recognition processing, which is available in nearly every smart phone that is manufactured today.

The mobile device to be locationed can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, smart phones, personal computers, and personal digital assistants, and the like, all referred to herein as a device. Each device comprises a processor that can be further coupled to one or two cameras, a keypad, a speaker, a microphone, a display, signal processors, and other features, as are known in the art and therefore not shown or described in detail for the sake of brevity.

In general, components such as processors, memories, and optical interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the aspects of the present invention may be implemented in any of the devices listed above or distributed across such components. It is envisioned that some portions of the present invention can be implemented in an application previously downloaded to the mobile device.

FIG. 1 is a block diagram of an orientation system, in accordance with the present invention. A plurality of reference markers are provided within the environment. In the example described herein, the reference markers can be ceiling-mounted light fixtures 10 with fluorescent lamps 116, for example, such that each edge of the light fixture is oriented to one of two orthogonal angles. The reference markers could also be floor tiles or regular floor markings. It should be recognized that any regular marking that is present within the environment could be used as long as the reference markers having straight edges and having a defined, regular orientation with respect to the environment, where all of the markers are oriented the same way with respect to the environment. Other examples that can be used as reference markers are ceiling tile frames, intersections between walls and ceiling, doorways, etc. Most buildings are built with orthogonal elements for construction and aesthetic reasons. Using existing, regularly oriented, rectangular light fixtures disposed in the ceiling of the environment results in reliable orientation since the orientation of each light fixture is known and fixed, and typically aligned with the building walls. In addition, ceiling light fixtures provide unobtrusiveness and clear sight lines.

The mobile device 100 can include at least one camera 106 coupled to an image processor 102 to process the image 110 received by the camera. Many smart phones today include both forward facing and rearward facing cameras. It is envisioned that the mobile device will have and use existing camera(s) and image processing circuitry. It should be recognized that other components, including a controller and the like, are not shown for the sake of simplicity of the drawings.

The mobile device processor 102 can also be coupled to a controller (not shown) and wireless local area network interface 104 for wireless communication with other devices in the communication network 120, such as a backend server 130. Alternatively, the mobile device 100 could be connected to the communication network 120 through a wired interface connection (not shown), such as an Ethernet interface connection.

The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

The backend server 130 can supply information about the orientation of the reference markers to a mobile device operating within the environment. For example, a building may be located on a site having walls that are directly aligned with north-south and east-west compass points, and the light fixtures are also aligned parallel to the walls of the building. Consequently, a mobile device operating within the building can be informed by a building server that the edges of every light fixture in the building are aligned with north-south and east-west compass points. The orientation information is a constant entered into the backend server that is the angle of the building and or reference markers relating to magnet north. In other words, the constant relates how the building and subsequently the light fixtures are situated on the property in relation to magnetic north. In the case where there is no stored angle constant, the mobile device can learn this constant on its own by averaging many samples of orientation estimates at many locations in the building. Such a result will not be as exact but will eliminate short term errors of the magnetometer. The advantage over gyroscope verification of magnetic orientation changes is that the present invention has no drift.

Figure 2:
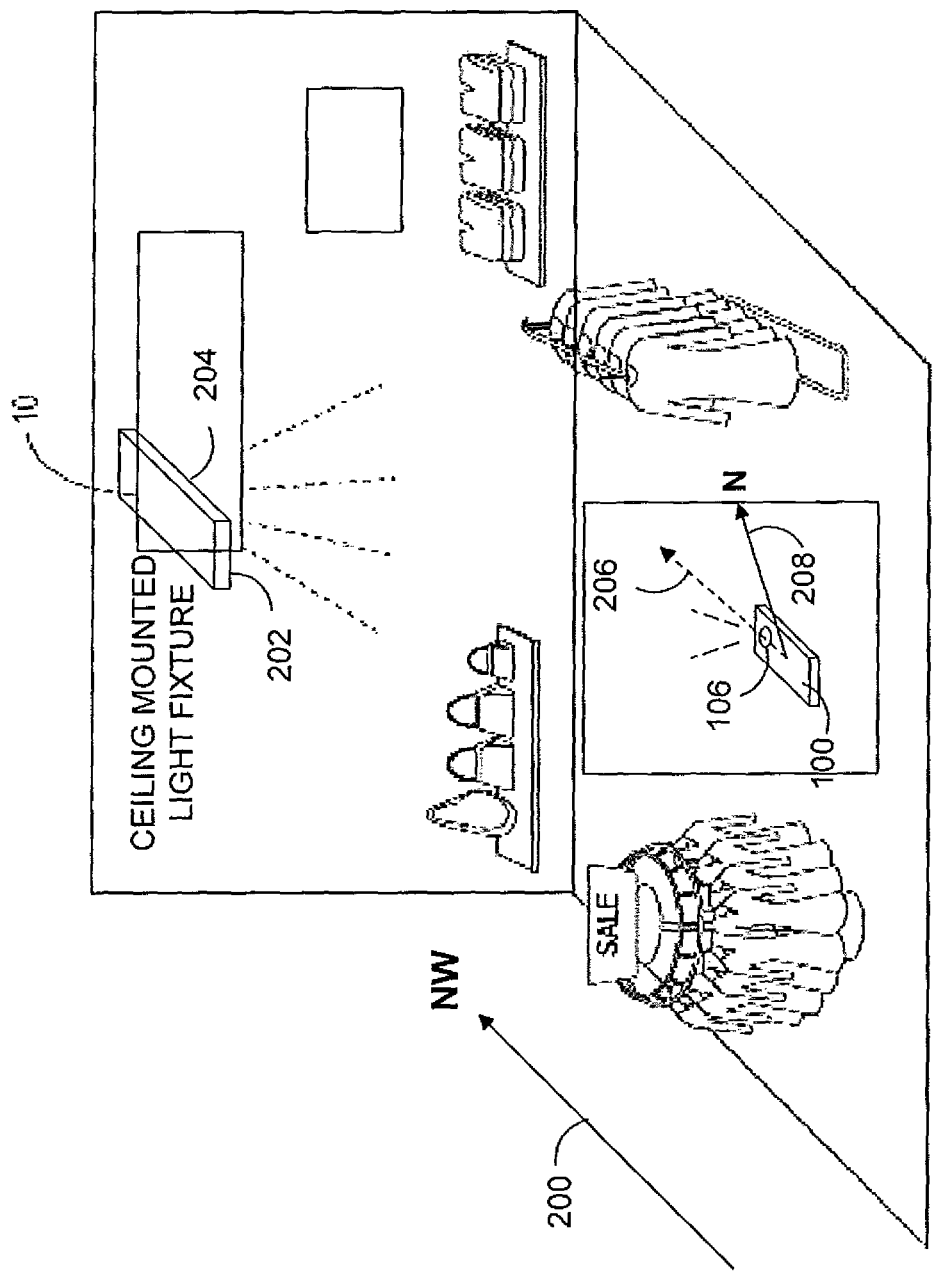
FIG. 2 is a perspective view of the system described in FIG. 1, applied in an operational environment.

Referring to FIG. 2, this constant 200 is supplied to the mobile device, where in the example shown the building and marker orientations are to the northwest, e.g. the constant supplied to the mobile device is 315 degrees. The mobile device can then estimate its orientation using at least one orientation sensor disposed within the mobile device. For example, a magnetometer in a smart phone can detect a north compass heading 208 of the mobile device, the compass heading being provided as the initial estimated orientation. This estimated orientation can be corrected by rotating the estimated orientation by the constant supplied by the server, resulting in a corrected estimated orientation 206 of northwest.

A camera 106 and image processor of the mobile device can then capture an image of any one of the reference markers (e.g. light fixtures 10). For a ceiling marker, a forward facing camera in the mobile device can be used. For a floor marker, rearward facing camera in the mobile device can be used. The image processor processes the camera frames to identify the respective markers. If more than one marker is in view, the image processor can simply choose largest (i.e. closest). Optimally, the image is taken directly perpendicular to the marker, such that the image of the marker is a regular rectangle. However, it may be that the image taken of the reference marker is at an angle. In the case of an angled view, a rectangle appears as a trapezoidal shape due to the change in linear perspective, with edges tapering together towards a horizon line. In this case, a known elevation angle of the marker in the image (see FIG. 3) could be used to correct for the tapering in order to determine the actual rectangular coordinates of the marker in the image.

Referring back to FIG. 2, the image processor can then locate at least one edge 202, 204 of the reference marker. It is preferred to use light fixtures 10 as reference markers since an image processor can easily detect the edges of light fixture by taking advantage of, or even maximizing, the contrast between the typical florescent lighting and the rest of the ceiling. It is also preferred to capture all edges of a light fixture in an image, but this may not be possible due to a user's body or other obstacle blocking view. Even so it is not necessary to capture all four edges, since one or two can be sufficient. When actively using the application, i.e. looking at the screen, the front facing camera is often looking towards the user, and towards the ceiling. Therefore the front facing camera can easily capture images without the user needed to orient the device towards the ceiling. In addition, the images can be captured without any user interaction. Since the lighting is fixed, as the user changes orientation, the camera image of the lighting orientation changes accordingly. Using image processing techniques, it is trivial to determine the orientation of the lighting fixture. In fact, if the image is captured at very short exposure times, the image will contain a black background, with a strong white/bright image of the lighting fixture. Ideally, the camera is configured at a greatly reduced frame rate to lower battery consumption—reduced from 30-60 FPS typical, to 0.5 to 5 FPS. Performing image recognition on such images is easier than recognizing objects in complex images.

The orientation of the located edge 204 is known to within ninety-degrees, since it is parallel to the supplied constant 200, which was supplied to the mobile device, and the markers are rectangular. It is assumed that any error in the estimated orientation using only the smart phone sensor (e.g. magnetometer) is much less than ninety-degrees (and is most typically less than twenty-degrees). Therefore it is a simple matter to correct the estimated orientation, which is subject to drift, to match that of the marker edge orientation 204 to the nearest ninety-degree orientation 206.

Accordingly, an orientation engine can compensate each sample of the estimated orientation 208 by correcting for the reference marker orientation 200, correcting for angle elevation, and aligning the corrected estimated orientation 206 to the edge of the reference marker 204 that is closest to being parallel to the corrected estimated orientation 206. In effect, the present invention "snaps" the orientation 206 of the mobile device to an orthogonal grid of the markers orientations 204. The orientation engine performing the compensation can be performed by the mobile device itself in its image processor and/or controller, or can be performed in the backend server if the mobile device provides the server with the appropriate information, including the gravity vectors, a position of the light source in the image, and a magnetometer reading from the mobile device.

It should be recognized that the present invention may not be able to provide accurate orientation compensation if the lighting fixtures are round, do not have straight and orthogonal edges, are irregularly orientated, or the server does not supply the marker orientation information. Optionally, the server could supply an indication to the mobile device not to use its orientation application.

Figure 4:
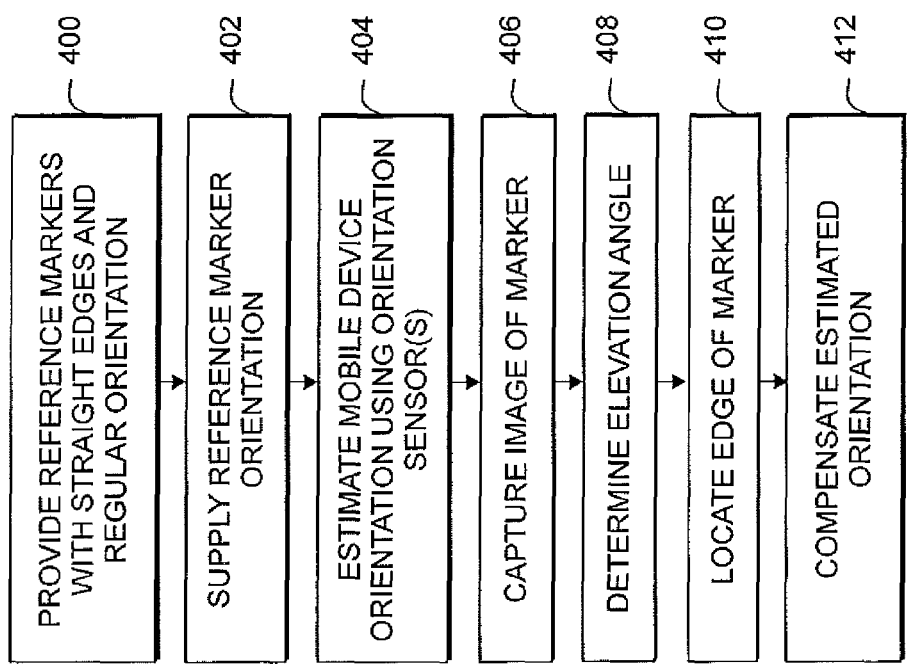
FIG. 4 is a flow diagram illustrating a method for compensating orientation, in accordance with the present invention.

FIG. 4 is a diagram illustrating a method of compensating an orientation of a mobile device within an environment, according to some embodiments of the present invention.

A first step 400 includes providing a plurality of reference markers having straight edges and being disposed within the environment, the reference markers having a defined, regular orientation with respect to the environment. The markers can be ceiling-mounted fluorescent light fixtures for example. The markers could also be floor tiles or regular floor markings. It should be recognized that any regular marking that is present within the environment could be used. All of the markers are oriented the same way with respect to the environment such that each edge of the light fixture is oriented to one of two orthogonal angles.

A next step 402 includes supplying information about the orientation of the reference markers to a mobile device operating within the environment. For example, a building may be located on a site having walls that are directly aligned with north-south and east-west compass points, and the light fixtures are also aligned parallel to the walls of the building. Consequently, a mobile device operating within the building can be informed by a building server that the edges of every light fixture in the building are aligned with north-south and east-west compass points.

A next step 404 includes estimating an orientation of the mobile device using at least one orientation sensor disposed within the mobile device. For example, a magnetometer in a smart phone can detect a compass heading of the mobile device, the compass heading being provided as the estimated orientation. Continuing the example above, a magnetometer in a smart phone that is entering the building from the south will indicate that the smart phone is oriented north.

A next step 406 includes capturing an image of any one of the reference markers (e.g. light fixtures) by a camera and image processor of the mobile device. For a ceiling marker, a forward facing camera in the mobile device can be used. For a floor marker, rearward facing camera in the mobile device can be used. Optimally, the image is taken directly perpendicular to the marker, such that the image of the marker is a regular rectangle. However, it may be that the image taken of the reference marker is at an angle. In the case of an angled view, a rectangle appears as a trapezoidal shape due to the change in linear perspective, with edges tapering together towards a horizon line. In this case, a known elevation angle of the marker in the image (as represented in FIG. 3) could be used to correct for the tapering in order to determine the actual rectangular coordinates of the marker in the image.

Figure 3:
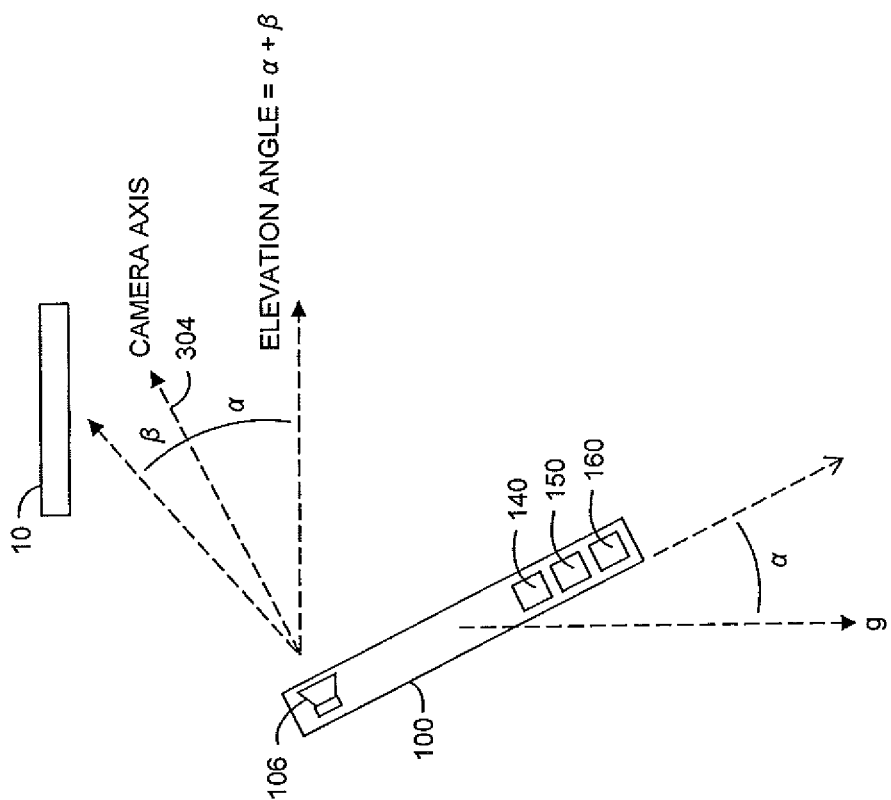
FIG. 3 is a side view of a device operable in the orientation system, in accordance with the present invention.

To determine the elevation angle, a next step 408 includes an accelerometer and/or other sensor data operable to detect gravity vectors of the mobile device in order to estimate an elevation angle of the reference marker from the mobile device (as represented in FIG. 3). This step includes recognizing a further vertical angle of a position of the marker in the image from an on-axis center position of the image view. This further vertical angle can be added to the gravity vector angle to determine the actual elevation angle of the marker from the mobile device.

A next step 410 includes locating at least one edge of the reference marker. The orientation of the edge is known to within ninety-degrees, since this information was supplied to the mobile device, and the markers are rectangular. It is assumed that any error in the estimated orientation using only the smart phone sensor (e.g. magnetometer) is much less than ninety-degrees (and is most typically less than twenty-degrees). Therefore it is a simple matter to correct the estimated orientation, which is subject to drift, to match that of the marker edge orientation to the nearest ninety-degrees.

Accordingly, a next step 512 is to compensate the estimated orientation by correcting for the reference marker orientation, correcting for angle elevation, and aligning the corrected estimated orientation to the edge of the reference marker that is closest to being parallel to the corrected estimated orientation. This compensation can be performed by the mobile device itself or in the backend server if the mobile device provides the server with the appropriate information.

Advantageously, the present invention provides a simple technique to compensate an orientation of a mobile device without requiring any hardware modification of hardware within the mobile device or of existing light fixtures within an environment. The present invention uses an existing camera and optical pattern recognition processing, which is available in nearly every smart phone that is manufactured today. The present invention can provide high orientation accuracy by only using an internal algorithm along with simply building orientation data from a building server. In addition, the present invention can be used for magnetometer calibration rather than compensation and save the user from spinning around in a circle, which is the typical calibration procedure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for compensating an orientation of a mobile device within an environment, the system comprising:
   a plurality of reference markers having straight edges and being disposed within the environment, the reference markers having a defined, regular orientation with respect to the environment;
   a server operable to supply information about the orientation of the reference markers to a mobile device operating within the environment;
   at least one orientation sensor disposed within the mobile device, the at least one orientation sensor operable to provide an estimated orientation of the mobile device;
   a camera and image processor disposed within the mobile device and operable to obtain images from the camera, the camera operable to capture an image of a reference marker, and the image processor operable to locate at least one edge of the reference marker; and
   an orientation engine coupled to the image processor and the at least one orientation sensor and being operable to compensate the estimated orientation by correcting for the reference marker orientation and aligning the corrected estimated orientation to the at least one edge of the reference marker that is closest to being parallel to the corrected estimated orientation.

2. The system of claim 1, wherein the reference markers are rectangular light fixtures, all oriented the same way with respect to the environment such that each edge of the light fixture is oriented to one of two orthogonal angles, and wherein the camera is a forward facing camera in the mobile device.

3. The system of claim 1, wherein the reference markers are flooring markings, all oriented the same way with respect to the environment such that each edge of the flooring markings is oriented to one of two orthogonal angles, and wherein the camera is a rearward facing camera in the mobile device.

4. The system of claim 1, wherein the at least one orientation sensor includes a magnetometer operable to detect a compass heading of the mobile device, the compass heading being provided as the estimated orientation.

5. A system for compensating an orientation of a mobile device within an environment, the system comprising:
   a plurality of light fixtures having straight edges and being disposed within the environment, the light fixtures all having a defined, regular orientation with respect to the environment;
   a server operable to supply information about the orientation of the light fixtures to a mobile device operating within the environment;
   a magnetometer disposed within the mobile device, the operable to provide an estimated compass heading of the mobile device;
   a camera and image processor disposed within the mobile device and operable to obtain images from the camera, the camera operable to capture an image of a light fixture, and the image processor operable to locate at least one edge of the light fixture; and
   an orientation engine coupled to the image processor and the at least one orientation sensor and being operable to compensate the estimated orientation by correcting for the light fixture orientation and aligning the corrected estimated orientation to the at least one edge of the light fixture that is closest to being parallel to the corrected estimated orientation.

* * * * *